Feb. 6, 1968 D. TIJUNELIS 3,368,014
PRINTING ONTO FOAMED PLASTICS
Filed May 1, 1963
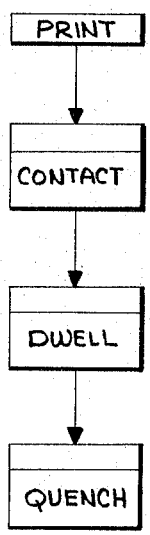
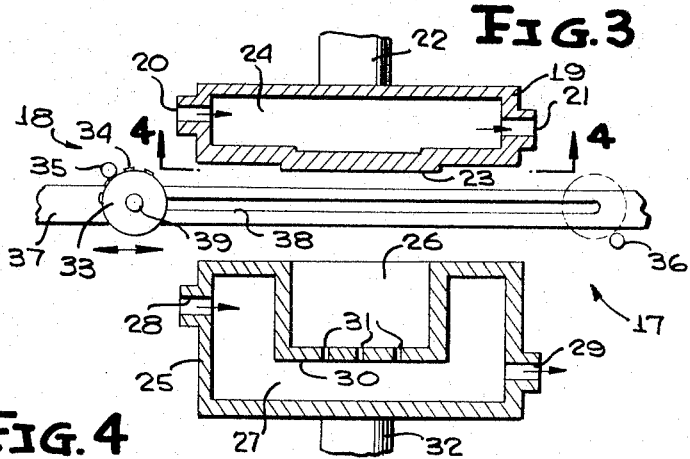
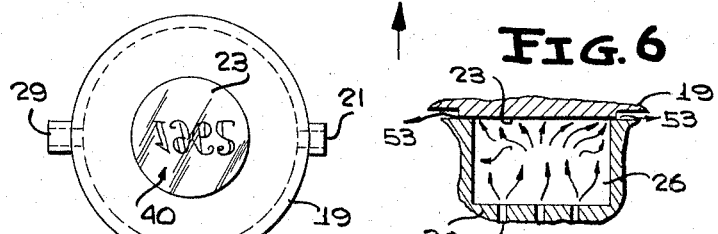
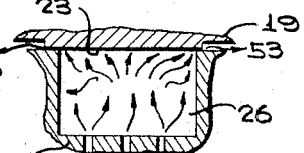
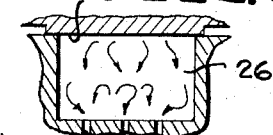
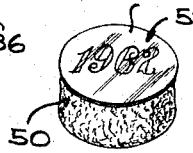
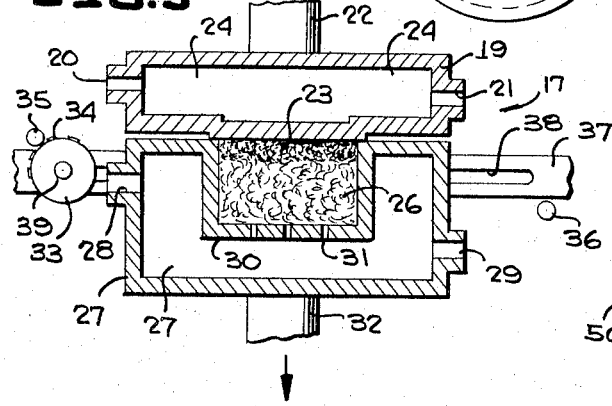
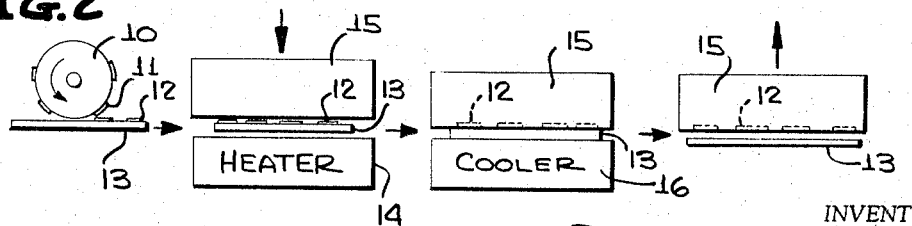
INVENTOR
DONATAS TIJUNELIS
BY
ATTORNEYS 3,368,014
PRINTING ONTO FOAMED PLASTICS
Donatas Tijunelis, Chicago, Ill., assignor to Continental Can Company, Inc., New York, N.Y., a corporation of New York
Filed May 1, 1963, Ser. No. 277,308
9 Claims. (Cl. 264—132)

This invention relates to printing onto yieldable thermoplastic foam.

One difficulty in the printing of thermoplastic foams, such as polystyrene foam made of expandable beads, is that the foam surface is not smooth and it deflects upon compression. Furthermore, the print on the soft foam surface is quite vulnerable to abrasion marking. It would be very useful to have a method of printing which could provide accurate reproduction as well as permanency and protection from abrasion. It would also be advantageous to be able to print a fragile and flexible foam article in a mold, thereby eliminating part of a processing step and providing support to a soft object to be printed.

Printing is always difficult on rough, grainy surfaces or on items which are soft enough to yield under printing press pressures. The use of conventional methods of printing in attempting to print onto foam has resulted in pinholing and smearing.

It is an object of this invention to provide a method of printing onto a surface of an article formed from foam plastic, which method comprises the steps of printing a carrier, contacting the surface of the article to the printed carrier, dwelling under contact pressure while the printing is being transferred from the carrier to the surface of the article and separating the article from the carrier.

Another object of this invention is to provide a method of printing onto a surface of thermoplastic foam comprising the steps of applying ink to a carrier, heating the carrier and the ink, contacting the surface to the ink and the carrier, cooling the heated carrier, and removing the carrier from the printed surface.

Another object of this invention is to provide a method of making a member of thermoplastic foam and simultaneously printing on the member comprising the steps of applying an inking compound to a carrier, providing a quantity of thermoplastic material adjacent to the carrier, heating the carrier, activating the thermoplastic material to cause it to expand into foam such that part of the foam engages the heated carrier and the inking compound carried thereby, and cooling said carrier and said foam.

Another object of this invention is to provide a method of simultaneously making and printing upon a member formed of thermoplastic material comprising the steps of applying a thermoplastic inking compound to a carrier, providing a quantity of thermoplastic material adjacent to the carrier, heating the carrier, activating the material to cause it to fuse and engage the carrier and inking compound and cooling the carrier and the material.

Another object of this invention is to provide a method of transferring printed matter to a foam article comprising the steps of printing onto a hot glossy surface which is heated to a temperature above the melting points of ink and foam, contacting the foam to the print under a pressure sufficient to prevent expansion of the foam, dwelling under contact pressure until the surface of the foam contacting the print is melted, and quenching while permitting a minimum release of contact pressure.

It is another object of this invention to provide a method of simultaneously molding an article and printing onto the article comprising the steps of preheating a mold, printing onto an inner surface of the mold, filling the mold with thermoplastic material, fusing the material by further heating the mold, dwelling while the surface of material in contact with the print is melted, quenching with a cooling agent, and removing the printed article from the mold.

With the above and other objects in view that will hereinafter appear, the nature of the invention will be more clearly understood by reference to the following detailed description, the appended claimed subject matter and the several views illustrated in the accompanying drawing.

In the drawing:

FIGURE 1 is a flow-diagram and shows the basic steps of a method used in printing onto foamed plastics.

FIGURE 2 is a flow-diagram and shows one form of the invention wherein a hot-transfer printing is used to print onto a foamed plastic article.

FIGURE 3 is a diagrammatic view partly in section, and shows a steam-chest compression mold which is used in making a foamed plastic article, and also shows a printing roller mounted in a guide rail so as to traverse an inner face of the mold and apply ink thereto.

FIGURE 4 is a bottom view of the inner face of the mold, taken on line 4—4 of FIGURE 3, and shows printed matter on the inner face of the mold.

FIGURE 5 is a view of the mold shown in FIGURE 4, with the mold shown in its closed position during the molding of a foamed plastic article.

FIGURE 6 is a diagrammatic view of a cavity of the mold and shows the approximate expansion-flow pattern during a portion of the molding cycle in which the plastic foam is expanding under steam pressure.

FIGURE 7 is a diagrammatic view of the cavity of the mold, similar to FIGURE 6, and shows the approximate expansion-flow pattern during that portion of the molding cycle in which the foamed plastic is cooling and has residual expansion after the steam under pressure has been shut off.

FIGURE 8 is a perspective view of the molded foamed plastic article and shows a smooth skin on the article with printing thereon.

A shell or skin on a surface of an expandable polystyrene foam article can be produced by a thermal treatment of that surface under pressure. The skin on the foam surface is produced by melting down and fusing some of the foam. The face of the foam article to be skinned should be made thick enough to allow for at least 10 to 20% shrinkage in the direction perpendicular to the skin.

The procedure for skinning is as follows:

(1) *Contact* the foam surface to be skinned to a polished metal surface heated to a temperature between 400° F. to 600° F. under a pressure no less than 0.5 to 1.0 lbs. per square inch.

(2) *Dwell* under the contact pressure for 0–4 seconds depending on the skin thickness desired.

(3) *Quench* the metal surface to a temperature below the softening point of the polystyrene.

The contact pressure must be maintained to prevent the heat treated foam from expanding. Release of the skinned surface from the metal surface is no problem and release agents are unnecessary. The thickness of the skin, its strength, pore size immediately under the skin, and the over all skin appearance can be varied by varying the temperature contact pressure, or dwell time.

It has been found that many inks will transfer from a glossy metal surface to polystyrene foam upon contact in the presence of heat. Thermoplastic ink printed on a piece of glossy aluminum foil can be transferred onto a polystyrene foam by placing the foil, print up, on a 450° to 600° F. hot-plate, then quickly stamping a foam article to be printed onto the hot print; holding it there under pressure for a few seconds until the hot foam surface fuses to the foil; quickly removing both the foam article and the aluminum foil adhering to it; then quickly pressing the aluminum surface to a cold metal. After the foam and aluminum foil cools, the foil can be stripped off leaving the print integrally embedded as a perfect mirror image in the hard glossy surface coincidentally produced on the foam.

Basically, the sequence of steps in hot-transfer printing onto foamed plastics are the same as for the case of surface skinning by the above described thermal treatment;

(1) *Print* on hot glossy metal surface. The surface temperature should be 400°–600° F. (This temperature is above the melting points of ink and plastic foam.)

(2) *Contact* foam surface to print. The contact pressure should be above 1 lb. per square inch to prevent foam cell expansion.

(3) *Dwell* under contact pressure for 2–4 seconds or as long as it is necessary to melt the foam surface which is contacting the print.

(4) *Quenching* with as little as possible release of contact pressure between the metal and foam surfaces. Preferably the quench should be through the metal surface.

After separation of the foam from the metal, it will be found that a mirror image print has been transferred and placed in or under a glossy hard polystyrene skin whose thickness is directly related to contact pressure, temperature and dwell time.

An example of a common composition that yields transfer printing onto foamed plastic is as follows:

Interchemicals Corporation's E O–340–Yellow, composed of: 75.76% RBH[1] P–569–E 594, 21.21% L–1529 ethyl cellulose solution, 3.03% tricresyl phosphate.

Many of the thermoplastic inks whether of the dye or pigment type would be applicable for hot-transfer printing by the above described technique as long as the ink can tolerate a few seconds of high temperature heat.

Referring to the drawing in detail, FIGURE 1 shows a flow-diagram of the basic sequence of steps in transferring printing onto foamed plastic. The four basic steps have been described above as print, contact, dwell and quench.

FIGURE 2 diagrammatically illustrates a printing roll 10 having raised type 11 for applying indicia 12, preferably composed of a thermoplastic link compound, to a thin sheet of foil 13, which is preferably made of aluminum and has a glossy surface. The sheet of foil 13 is then heated, such as by heater 14 and a foamed plastic article 15 is brought into contact with the sheet of foil 13 and the indicia 12 thereon. A contact pressure of approximately 1 lb. per square inch should be applied to prevent expansion of the cells of the plastic foam. The article is held under pressure for a few seconds or until the hot foam surface fuses to the foil 13, then the article 15 and the foil 13 adhering to it are quickly pressed against a cold surface such as the cooler 16. The article 15 and the foil 13 cools very rapidly. At this time, the foil 13 can be stripped off leaving the indicia 12 integrally embedded as a perfect mirror image in the hard glossy surface coincidentally produced on the foam.

The above described printing technique can also be used to print upon a foamed plastic article during the same time that the article is being molded. Referring to FIGURE 3, there is shown a two-piece mold, generally referred to by the numeral 17, and a printing mechanism, generally referred to by the numeral 18.

The two-piece mold 17 includes a top part 19, which has an inlet port 20 for supplying steam or quench water to the top part 19, an exhaust port 21 for the steam or quench water, a stationary supporting member 22, and a glossy metal surface 23 which may be polished stainless steel. Steam or quench water is supplied through the inlet port 20 to a cavity 24 and is exhausted through the exhaust port 21, to respectively heat or cool the surface 23.

A bottom part 25, of the two-piece mold 17, includes a molding cavity 26 constructed in accordance with the desired shape of the article to be molded. Partly surrounding the molding cavity 26 is a fluid cavity 27 which has an inlet port 28 and an exhaust port 29. The molding cavity 26 includes a closure plate 30 which has a plurality of steam ports 31 which allow communication of steam between the fluid cavity 27 and the molding cavity 26. The bottom part 25, of the two-piece mold 17, is also provided with a movable molding press linkage 32 which supplies the necessary opening and closing action for the mold 17.

The printing mechanism 18 includes a print roll 33 which has raised type 34 thereon. During the period of the molding cycle when, after ejection of a molded item, the mold is still open, the print roll 33 may be made to traverse between the upper part 19 and the bottom part 25 of the two-piece mold 17 and the raised type 34 is made to contact inner face or surface 23 of the upper part 19 and deposit an inking compound, such as the thermoplastic ink described above, thereon. The traversing action of the print roll 33 may be terminated by an ink applicator roll 35, at the left side of the mold 17, or an ink applicator roll 36 at the right side of the mold 17, as shown in FIGURE 3. The ink applicator rolls 35 and 36 are used to apply fresh ink during the period of the molding cycle when the mold is closed. The traversing motion of the print roll 33 may be motorized in any one of a number of conventional ways. The use of two ink applicator rolls, such as rolls 35 and 36, requires only a single traversing action of the print roll 33 for each molding cycle. Synchronization between the opening and closing of the mold 17 and the traversing action of the print roll 33 may be accomplished by conventional mechanical or electrical means.

The traversing action of the print roll 33 is along a path which is governed by a guide rail 37 which has a slot 38 therein. As shown, the slot 38 is in a straight line but may also be curved to provide a guide path such that the print roll 33 could enter the mold cavity 26 rather than coming into contact with the surface 23. The print roll 33 is mounted on a shaft 39 which is disposed in the slot 38, and if so desired, cooperating teeth may be provided for the slot 38 and the shaft 39 to properly index the raised print 34 and the surface 23.

FIGURE 4 shows the surface 23 as being a carrier for printed matter, generally indicated by the numeral 40, which printed matter 40 is shown for illustrative purposes as being "1962," and is composed of a thermoplastic inking compound.

A typical printing and molding cycle employed to produce a foamed thermoplastic article 50, shown in FIGURE 8, by using a mold 17, as shown in FIGURE 3, is as follows:

(1) Print the carrier or surface 23 with the printed matter 40.

(2) Preheat the mold 17 with saturated steam.

---

[1] RBH P–569–E 594: 60.0% lemon yellow, 8.0% N–4 ethyl cellulose, 9.6% ethyl alcohol, 22.4% toluol.

(3) Fill the mold cavity 26 with thermoplastic beads (equal to the weight of the desired foam article).

(4) Fuse the thermoplastic material by applying saturated steam thereto through the steam ports 31.

(5) Dwell for sufficient time to permit the thermoplastic material to melt and form a surface skin.

(6) Quench the mold 17 by supplying cooling water through the inlet ports 20 and 28.

(7) Open the mold 17, by using the movable linkage 32, and remove the molded article 50.

The article 50 produced by this printing and molding technique has a skinned surface 51 which has the printed matter 52 (which is a mirror image of the printed matter 40) embedded therein.

A mold constructed as shown in FIGURES 3 and 5 so that the steam ports 31 are on the opposite side of the molding cavity 26 from the carrier or surface 23 is well suited for forming the skin 52 of the article 50 during the molding cycle of raw thermoplastic beads (not shown). By allowing the mold 17 to vent along the edges of the surface 23 a flow pattern of the foaming material is created which follows the general path shown in FIGURE 6.

The thermoplastic beads expand, when heated, and are somewhat lifted by the steam entering the steam ports 31 and are directed toward the surface 23 of the upper part 19 of the mold 17. The pressure generated by the vapor pressure of the volatile component in the thermoplastic beads forces the foam to flatten out and compress against the surface 23 toward which the expansion flow is directed. The foam flows toward the vents (which are indicated by the arrows 53 as is shown in FIGURE 6) and toward the flat surface 23 due to steam flow and the expansion of the foam. The result is that near the surface 23 a very high density foam develops while the foam which is spaced inwardly of the cavity 26 loses density.

FIGURE 7 shows an approximate expansion-flow pattern during that portion of the molding cycle after the steam pressure has been released. There is enough residual expansion of the thermoplastic foam to fill out, if necessary, any deformations produced by the inflow of steam through the steam ports 31. The high density skin 51 takes up the gloss of the surface 23 and retains a glossy finish.

It is apparent from the foregoing description that various apparatus and methods have been disclosed for treating thermoplastic material. It is within the scope of this invention to produce only a skin upon the material, or to produce a printed skinned surface which includes indicia or to produce a skinned surface which is completely coated with a coloring compound, or to produce a composite colored and printed skin surface.

While preferred forms and arrangement of parts have been shown and various methods have been described in illustrating the invention, it is to be clearly understood that various changes in details and arrangement of parts and various changes in the methods described may be made without departing from the spirit and scope of the invention as defined in the appended claimed subject matter.

I claim:

1. A method of printing onto a surface of foamed plastic comprising the steps of printing on a hot glossy metal surface, contacting the surface of the foamed plastic to the printing on the hot glossy metal surface, dwelling under contact pressure to melt the surface of the foamed plastic, and cooling the metal and foamed surfaces.

2. A method of printing onto a surface of thermoplastic foam comprising the steps of applying a thermoplastic ink to a carrier, heating the carrier and the ink for plasticizing said ink, contacting the surface of said foam to the ink and the carrier, cooling the carrier and the ink and the foam, and then removing the carrier from the foam.

3. A method of making a member of thermoplastic foam and simultaneously printing on said member comprising the steps of applying an inking compound to a carrier, providing a quantity of expandable thermoplastic material adjacent to said carrier, heating said carrier for plasticizing said inking compound, activating the thermoplastic material for causing it to expand into foam and fill said mold such that part of the foam engages the heated carrier and the inking compound carried thereby, and cooling said carrier and said foam.

4. A method of simultaneously making and printing upon a member formed of thermoplastic material comprising the steps of: applying a thermoplastic inking compound to a carrier, providing a quantity of expandable thermoplastic material adjacent to said carrier, heating said carrier for plasticizing said inking compound, activating the material to cause it to expand and engage said carrier and inking compound, and cooling said carrier and said material.

5. A method of transferring printed matter to a foam article comprising the steps of printing with ink onto a hot glossy surface which is heated to a temperature above the melting points of ink and foam, contacting the foam article to the print under a pressure sufficient to prevent expansion of the foam article, dwelling under contact pressure until the surface of the foam article contacting the print is melted, and rapidly cooling said foam article.

6. A method of simultaneously molding an article and printing onto the article comprising the steps of: preheating a mold, printing onto an inner surface of the mold, partially filling the mold with expandable thermoplastic material, fusing the material by further heating the mold for causing expansion of said material to fill said mold, dwelling while the surface of material in contact with the print is melted, quenching said mold with a cooling agent for conducting heat from said article, and removing the printed article from the mold.

7. A method of hot-transfer printing onto a thermoplastic foam article comprising the steps of printing on a heated surface which is heated to a temperature between 400° F. and 600° F., contacting the foam article to the heated surface with a contact pressure of at least 0.5 p.s.i., dwelling under the contact pressure until the surface of the foam article is melted, and cooling the heated surface to a temperature below the melting temperature of the foam article while maintaining substantially the same contact pressure.

8. A method of simultaneously molding an article and printing onto the article comprising the steps of applying a printing compound in the form of the desired indicia to a surface of a carrier, preheating a mold, partially filling the mold cavity with an expandable thermoplastic material, closing the mold so that the printed carrier surface is disposed inside the mold and adjacent to said thermoplastic material, raising the temperature of the carrier surface and mold to cause the thermoplastic material to expand and completely fill the mold cavity and be brought into contact with said printed carrier surface, dwelling a sufficient time to melt the surface of the thermoplastic material which is in contact with the carrier surface, and cooling the mold and article to a temperature below the melting point of the thermoplastic material.

9. Apparatus for simultaneously molding a thermoplastic foam article and coating the article, the apparatus comprising a mold which includes a first part and a second part, a surface on said first part adaptable to receive a coating compound, means for applying the coating compound to said first part, means for moving said first part of the mold relative to said second part of the mold, means for heating and cooling the mold; said means for applying the coating compound comprising a printing device for coating the said first part with printed indicia.

(References on following page)

References Cited

UNITED STATES PATENTS

| | | | |
|---|---|---|---|
| 273,527 | 3/1883 | Herbert | 264—132 |
| 2,268,594 | 1/1942 | Huber | 101—426 |
| 2,722,038 | 11/1955 | Freund | 264—132 |
| 2,767,436 | 10/1956 | Noland et al. | 264—321 |
| 2,787,809 | 4/1957 | Stastny | 264—53 |
| 2,865,800 | 12/1958 | Stastny | 264—46 |
| 3,057,017 | 10/1962 | Sucher | 264—132 |
| 3,058,161 | 10/1962 | Beyer et al. | 264—47 |
| 3,094,449 | 6/1963 | Sisson | 264—53 |
| 3,144,493 | 8/1964 | Santelli | 264—51 |
| 3,194,857 | 7/1965 | White | 264—132 |
| 3,211,605 | 10/1965 | Spaak et al. | 264—52 |

FOREIGN PATENTS 580,884　8/1959　Canada.

ALEXANDER H. BRODMERKEL, *Primary Examiner.*
P. E. ANDERSON, *Assistant Examiner.*